Feb. 17, 1970 F. LAA 3,495,835

MAGAZINE-TYPE MAGNETIC TAPE RECORDER WITH SEPARATE AND MOVABLE TAPE SCANNING ELEMENT SUPPORT AND/OR TAPE PRESSURE ELEMENT SUPPORT

Filed Oct. 27, 1967 2 Sheets-Sheet 1

INVENTOR.
FRIEDRICH LAA

BY

AGENT

FRIEDRICH LAA INVENTOR.
BY
Frank R. Trifari
AGENT

United States Patent Office 3,495,835
Patented Feb. 17, 1970

3,495,835

MAGAZINE-TYPE MAGNETIC TAPE RECORDER WITH SEPARATE AND MOVABLE TAPE SCANNING ELEMENT SUPPORT AND/OR TAPE PRESSURE ELEMENT SUPPORT

Friedrich Laa, Vienna, Austria, assignor, by mesne assignments, to U.S. Phillips Corporation, New York, N.Y., a corporation of Delaware Filed Oct. 27, 1967, Ser. No. 678,622
Claims priority, application Austria, Nov. 3, 1966, A 10,187/66
Int. Cl. G11b 5/02
U.S. Cl. 274—4 5 Claims

ABSTRACT OF THE DISCLOSURE

A tape recording and playback apparatus having separate, movable supports for the tape magazine and for the tape scanning and/or tape pressure elements. As the tape magazine support is moved toward the apparatus for engagement of the tape, the scanning and pressure element support is simultaneously slid by means of a cam and cam follower toward the tape and into an operative relationship therewith.

Figure 1:
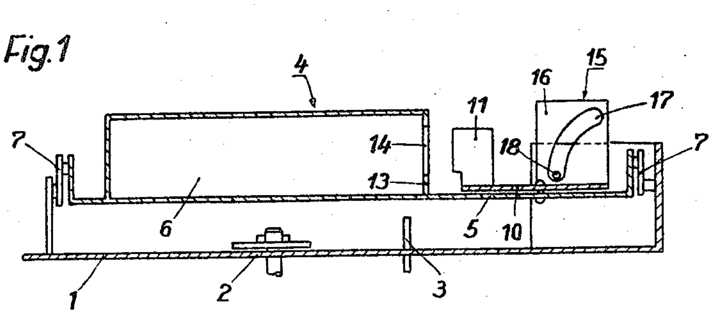

The invention relates to a recording and/or play-back apparatus for a tape-shaped record carrier accommodated in a magazine with one of the narrow sides of the magazine having apertures for the entrance of tape scanning and/or tape pressure elements arranged on a movable support. The main surfaces or wide sides have apertures for receiving winding spindles as well as a driving shaft which is arranged on the apparatus. A loading holder, comprising a sheath-like member is provided on the apparatus, and when in a first position a tape magazine can be placed into same. The holder can be moved, by lowering same, into a second position in which the magazine is positioned on the winding spindles and the driving shaft and the tape scanning and/or tape pressure elements are moved towards the magazine.

In known apparatus of this type the support for the tape scanning and/or tape pressure elements, as well as the winding spindles and the driving shaft, respectively, are arranged on the chassis of the apparatus. In order to make the apparatus ready for operation, first the loading holder is lowered to position the magazine on the winding spindles and the driving shaft, respectively, and, secondly, the support with the tape scanning and/or tape pressure elements is moved towards the magazine. In order to achieve the last-mentioned operation, a separate operating member can be provided in addition to the operating member for lowering the loadings holder, but it has also been proposed already to move the support towards the lowered magazine by means of an electromagnet, said electromagnet being supplied with current by means of a switch which is closed by the loading holder in its lowered position. Various difficulties occur in such apparatus, since in apparatus of the first mentioned type two separate operations are necessary, namely lowering the magazine and moving the support towards the magazine, while in apparatus of the last-mentioned type the electromagnetic movement of the support towards the loading holder may likewise be effected only at the instant at which the loading holder will be lowered fully on the chassis of the apparatus, which in practice can be realized only with difficulty with the required reliability.

According to the invention, said difficulties are avoided in that the support for the tape scanning and/or tape pressure elements is arranged on the loading holder outside the sheath-like member so as to be movable relative to the said sheath-like member and that for moving the support a cam and cam-follower means is provided which moves the support towards the sheath-like member when the loading holder is lowered. In this manner a separate operating member for moving the support towards the lowered loading holder is not necessary and operation occurs with absolute reliability since on the one hand the instant of the beginning of the movement of the support towards the magazine is not critical because the support is moved along with the holder, and on the other hand the timely ending of the movement can be effected and controlled as desired within a given time period.

A particularly simple construction is obtained if a cam follower pin is provided on the support and a curved track, cam surface or the like is provided on the apparatus with which the follower pin is in contact. The curved track is preferably arranged on a slide which is movable by means of an operating member for switching on fast movement of the record carrier, so that in such an operating condition the support is moved away from the sheath-like member.

Since the construction according to the invention permits obtaining space-saving arrangements, such apparatus may be constructed to be very small and are consequently very readily suitable, for example, for building-in in a car dashboard, if required together with a radio receiver, in which, as is known, only a very restricted space is available in accordance with the standards. Since, said apparatus are also very simple to handle, they are also readily suitable for use in vehicle. For such apparatus, in which the magazine comprises the apertures for the entrance of the tape scanning and/or tape pressure elements in one of its longer narrow sides, it has proved of particular advantage when the magazine can be inserted into the sheath-like member with one of its shorter narrow sides leading and the support is provided beside one of the longer narrow sides of the sheath-like member.

In order that the invention may readily be carried into effect, two embodiments thereof will now be described in greater detail, by way of example, with reference to the accompanying drawings, in which:

FIGURE 1 shows partly in cross-section and

Figure 2:
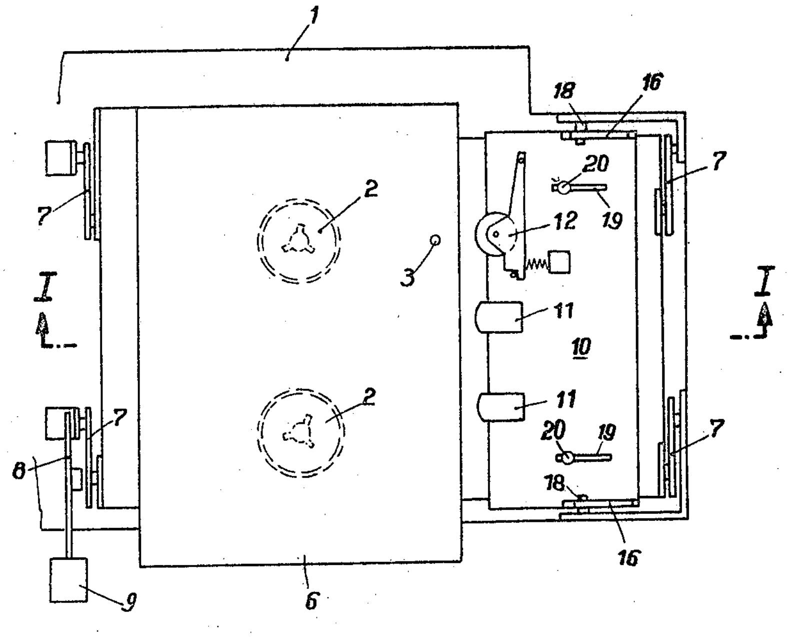

FIGURE 2 in plan view a first embodiment in which the support is slid towards the loading holder.

FIGURE 3 shows again partly in cross-section and

Figure 4:
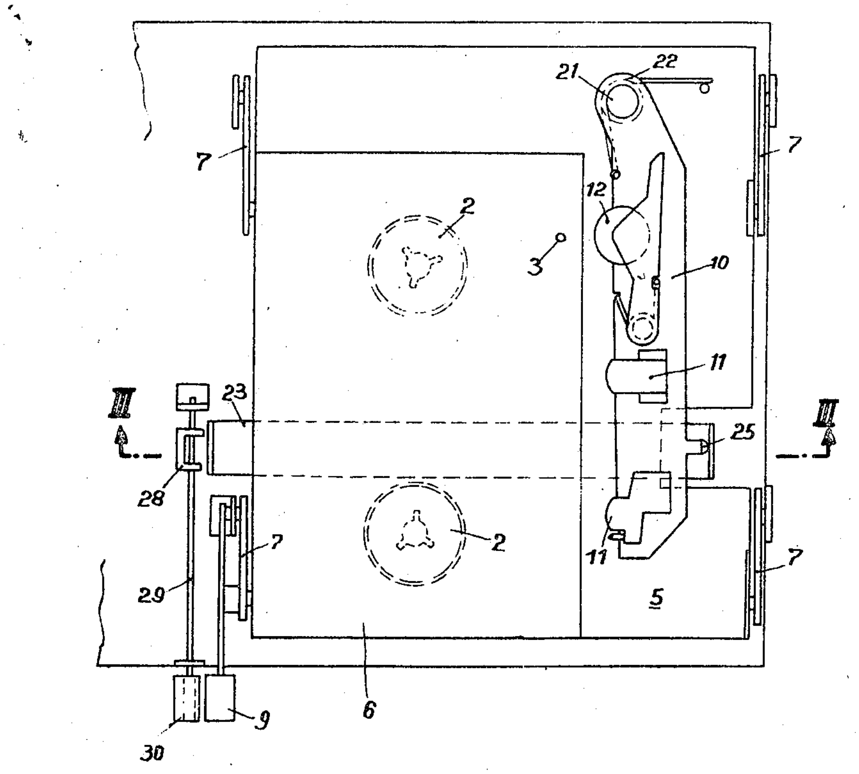

FIGURE 4 in plan view a second embodiment in which the support is pivoted towards the loading holder.

In these figures, like components are denoted by the same reference numerals.

Referring now to FIGURES 1 and 2, reference numeral 1 denotes a chassis of an apparatus, on which winding spindles 2 and a driving shaft 3 are provided. A loading holder 4 consists of a table-like or main support part 5 and a sheath-like member 6 in which a magazine can be loaded. This loading holder is pivotally arranged on the chassis of the apparatus by means of four levers 7. The rod 8 of an operating member 9 pivotally arranged on the chassis is coupled to one of the levers 7 so that the loading holder can be lowered by means of said lever from the position shown in which a magazine can be loaded in the holder, to a second position on the chassis of the apparatus in which the winding spindles and the driving shaft enter the sheath-like member where they are effectively connected to a magazine.

On the table-like part 5 of the loading holder, the secondary support 10 for tape scanning and/or tape pressure elements cooperating with the record carrier (namely the magnetic heads 11 and the pressure roller 12) is arranged outside the sheath-like member 6. The support can be moved at right angles to the sheath-like member 6 in which during the movement towards said member the elements provided on said support can enter into same through an aperture 14 in the sidewall 13. The sliding movement of the support occurs automatically during the lowering of the loading holder for which purpose a cam and cam-follower means 15 is provided. Said means 15 consists of a plate 16 arranged on the sides of the support 10 and comprising a curved track 17 in the form of a slot in which a follower pin 18 projects which is rigidly secured to the chassis. For guiding the support 10 towards the holder, the support is provided with slots 19 through which project guide bolts 20 secured to the holder.

The operation is such that, as soon as a magazine loaded in the sheath-like member is to be moved to the operating position, the loading holder is lowered by means of the operating member 9. During lowering, the support arranged on the holder is simultaneously moved towards the sheath-like member and consequently also towards the magazine in such manner that the pins 18 move the support through the slots 17. As may be seen, any desired movement of the support may be realized by the construction of the slots 17 so that the instant at which the tape scanning and tape pressure elements enter the magazine can be chosen at random and is entirely defined with respect to the lowering of the holder, and thus with respect to the connection of the magazine to the winding spindles and the driving shaft. When the loading holder is raised for readjusting to the initial position, the support is simultaneously moved away again from the sheath-like member in an analogous manner so that the magazine may be taken out of the holder.

Figure 3:
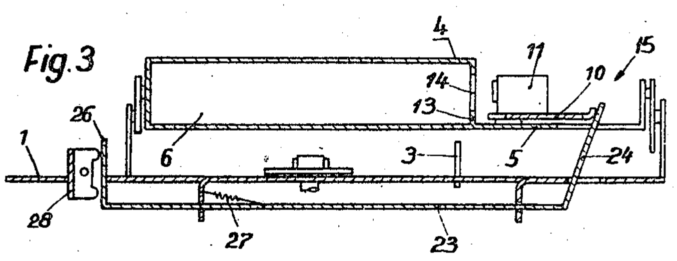

In the embodiment shown in FIGURES 3 and 4, the support 10 is arranged on the table-like part 5 of the loading holder 4, so as to be pivotable about the shaft 21 in the direction of the sheath-like member 6 against the action of a spring 22. The cam and cam follower means 15 in this embodiment consists of an inclined cam surface 24 arranged on a slide 23, which surface contacts a follower pin 25 arranged on the support 10 under the action of the spring 22.

The slide 23 is arranged on the chassis of the apparatus so as to be movable in the direction of pivoting of the support and engages with one end 26 a double cam disk 28 under the action of a spring 27. Said cam disk is secured to a shaft 29 which is pivotally journalled in the chassis and can be pivoted through an angle of approximately 45° clockwise and anticlockwise by means of an operating member 30. Said operating member also serves for switching on the fast forward and fast rewind, in accordance with a movement in any of the above-mentioned directions, which is not shown, however.

When the loading holder is lowered by means of the operating member 9, the support 10 is moved towards the sheath-like member 6 and a magazine arranged in said member 6, respectively, through the inclined surface 24 and the follower pin 25, so that the elements 11, 12 arranged on said support enter the magazine at a predetermined instant and contact the record carrier. When the loading holder is raised, the support leaves the magazine again in an analogous manner.

When the loading holder is in the lower position and the operating condition "fast forward" or "fast rewind" is switched by means of the operating member 30 for fast movement of the record carrier, the slide 23 is moved through the cam disk 28 in such manner that the abutting surface 24 is moved away from the sheath-like member 6, that is to say to the right in the figure. Since the follower pin 25 arranged on the support always follows the surface 24 under the action of the spring 22, the support will thus be moved out of the sheath-like member 6. In this manner the fast movement operation can be effected without the record carrier contacting the head 11 and the pressure roller 12. As soon as the fast movement operation is finished, that is to say the cam disk 28 is returned again to its initial position, the slide 23 also returns to its initial position under the action of the spring 27, the support 10 being moved again towards the sheath-like member 6.

With the above described measures, it has become possible to realize apparatus of the type mentioned in the preamble with small dimensions which is of importance in particular for some apparatus which have to be built in in a car dashboard since, as a result of the standards already existing for radio receivers, only very little space is available for them. For apparatus in which the magazine comprises the apertures for the entrance of the tape scanning and/or tape pressure elements in one of its longitudinal narrow sides, it has proved particularly favourable in this connection if the magazine can be moved into the sheath-like member with one of its shorter narrow sides leading and the support is provided beside one of the longer narrow sides of said member the sheath as is shown in the above described figures.

What is claimed is:

1. A transducing apparatus for a tape-shaped record carrier accommodated in a magazine one of the narrow sides of the magazine comprising apertures for the entrance of tape scanning and tape pressure elements arranged on a movable support and the main surfaces comprising apertures for receiving winding spindles as well as a driving shaft arranged on the apparatus, a loading holder, comprising a sheath-like member being provided on the apparatus, in a first position of said holder the magazine being movable into same, said holder being movable, by lowering same, into a second position in which the magazine is positioned on the winding spindles and the driving shaft and in which the support is moved towards the magazine, characterized in that the support for the tape scanning and tape pressure elements is arranged on the loading holder outside the sheath-like member so as to be movable relative to said sheath-like member and that for moving the support a cam and cam-follower means is provided which moves the support towards the sheath-like member when the loading holder is lowered.

2. An apparatus as claimed in claim 1, characterized in that for forming the cam and cam-follower means the support comprises a follower pin and the apparatus comprises a cam surface, with which the follower pin is in contact.

3. An apparatus as claimed in claim 2, characterized in that the curved track is provided on a slide which is movable by means of an operating member for switching on a fast movement of the record carrier so that in such an operating condition the support is moved away from the sheath-like member.

4. An apparatus as claimed in claim 1, in which the magazine comprises the apertures for the entrance of the tape scanning and tape pressure elements in one of its longer narrow sides, characterized in that the magazine can be inserted into the sheath-like member with one of its shorter narrow sides leading and the support is arranged beside one of the longer narrow sides of the sheath-like member.

5. A movable support arrangement for a tape transducing apparatus comprising:

a chassis having a tape driving shaft and winding spindle, a main support spaced from the chassis and mounted for movement toward and away from the chassis, a tape loading holder mounted on said main support such that when said main support is moved toward said chassis a tape magazine in the holder will engage the tape driving shaft and winding spindle, a secondary support for the tape scanning and pressure elements of the apparatus, said secondary support having cam and cam follower means for sliding the scanning and pressure elements into operative relationship with the tape simultaneously with the movement of the main support toward the chassis.

References Cited

UNITED STATES PATENTS

| | | | |
|---|---|---|---|
| 2,969,929 | 1/1961 | Rudzitis | 274—4 |
| 3,146,316 | 8/1964 | Knoth | 179—100.2 |
| 3,167,267 | 1/1965 | Crane | 274—11 |
| 3,385,534 | 5/1968 | Starr | 274—4 |
| 3,395,871 | 8/1968 | Ackermann et al. | 274—4 |

BERNARD KONICK, Primary Examiner

JEROME P. MULLINS, Assistant Examiner

U.S. Cl. X.R.

179—100.2; 242—198